No. 73,903.      PATENTED JAN. 28, 1868.
P. JONES.
CLIP AND FERRULE FOR JOINTS ON FELLOES.

Witnesses:
W. H. Baldwin
Wm. M. Gooding

United States Patent Office.

PHINEAS JONES, OF NEWARK, NEW JERSEY.

Letters Patent No. 73,903, dated January 28, 1868.

IMPROVEMENT IN CLIP AND FERRULE FOR JOINTS ON FELLOES.

*The Schedule referred to in these Letters Patent and making part of the same.*

TO ALL WHOM IT MAY CONCERN:

Be it known that I, PHINEAS JONES, of the city of Newark, in the county of Essex, and State of New Jersey, have invented an Improvement in an Appliance to the Joints in Felloes for the Wheels of Carriages; and I do declare the following to be a full and exact description of the same, reference being had herein to the drawings that accompany this specification, as part of the same.

The nature of my improvement consists in combining in one whole a clip and a ferrule, obtaining advantages thereby not to be had by the use of the two separately. In the drawings—

Two very important objects are gained by the improvement: the joint is prevented from settling, and the ends of the rim of the felloes are preserved from checking or splitting.

Figure 1:
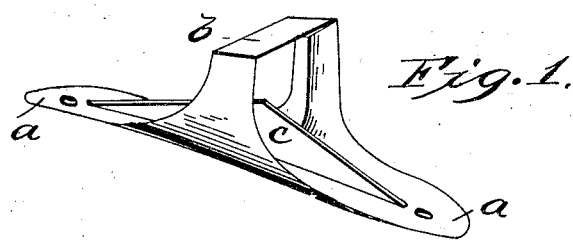
Figure 1 is the clip $a$ and the ferrule $b$, as combined in one whole.
Figure 2:
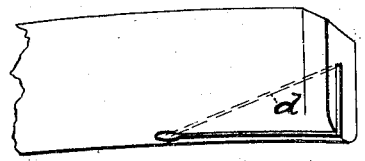
Figure 2 is an end of a felloe fitted to the ferrule $b$.
Figure 3:
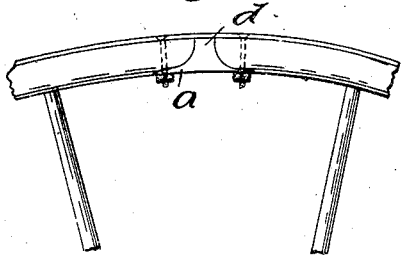
Figure 3 shows the felloes jointed together in a wheel by the combined ferrule and clip.

The ferrule is tapered from the inside to sharp edges, the setting of the tire drawing the ends of the felloe to a solid bearing in the ferrule. Where greater strength is required in the support of a joint, the rib $c$, fig. 1, can be added to the combination.

I am aware that felloes have before been connected by tenoning their ends, and fitting them into metallic ferrules or sockets, and also by the joint of the felloe being formed over or near the spoke, and held together by a socket, and supported by the spoke. This I do not claim.

The superiority of my invention consists in avoiding the formation of a shoulder in the wood, or cutting away any part of the same, to diminish its strength, my band-clip being formed with the outer portion (near the tire of the wheel) narrow, and so constructed that a small chamfer on the wood admits the narrow portion of the clip to come flush with the wood, while the inner or long part of the clip is entirely on the outside of the wood. The ends of the clip are connected by bolts to the tire, forming a joint that is neat and comely in its appearance, and at the same time so strengthening the felloe at the joint that it has no weak place, but will retain its position in use.

My invention would be of comparatively little use without the bolts to support the ends of the felloe. The extension of the clip completely around the ends of the felloe, in the form of a band, is necessary, to protect the wood from splitting; and the union with such band of the long portion of the clip on the inside of the wheel constitutes an effective brace or truss, to prevent any working or sagging of the joints.

What I claim as my improvement, and desire to secure by Letters Patent, as a new article of manufacture and use, is—

The combined clip $a$ and ferrule $b$, with the rib $c$, made substantially as specified and shown.

PHINEAS JONES.

Witnesses:
W. H. BALDWIN,
W. M. GOODING.